United States Patent [19]
Panesar et al.

[11] Patent Number: 5,882,717
[45] Date of Patent: Mar. 16, 1999

[54] SOLUBLE ESPRESSO COFFEE

[75] Inventors: Satwinder Singh Panesar, Banbury, United Kingdom; Evan Joel Turek, Brewster, N.Y.; William Artur Jeffs, Horton Nr Banbury, United Kingdom

[73] Assignee: Kraft Foods, Inc., Northfield, Ill.

[21] Appl. No.: 739,767

[22] Filed: Oct. 30, 1996

[51] Int. Cl.⁶ .............. A23F 5/00; A23B 11/03; A23B 4/044
[52] U.S. Cl. .......... 426/595; 426/594; 426/456; 426/443; 426/470; 426/471
[58] Field of Search .................. 426/594, 650, 426/651, 448, 388, 432, 433, 434, 474, 475, 476, 595, 456, 443, 470, 471

[56] References Cited

U.S. PATENT DOCUMENTS

| | | | |
|---|---|---|---|
| 3,620,756 | 11/1971 | Strobel et al. | 99/71 |
| 3,749,378 | 7/1973 | Rhodes | 99/71 |
| 4,618,500 | 10/1986 | Forquer | 426/433 |
| 4,830,869 | 5/1989 | Wimmers et al. | 426/595 |
| 4,903,585 | 2/1990 | Wimmers et al. | 99/275 |
| 5,079,026 | 1/1992 | Arora et al. | 426/594 |

FOREIGN PATENT DOCUMENTS

| | | |
|---|---|---|
| 670794 | 9/1963 | Canada . |

OTHER PUBLICATIONS

E.J. Crosby and R.W. Weyl, Foam Spray Drying: General Principles, AIChhE Symposium Series, No. 163, vol. 73, 1977 pp. 82–94.

*Primary Examiner*—Marian C. Knode
*Assistant Examiner*—Datquan Lee
*Attorney, Agent, or Firm*—Thomas A. Marcoux; Thomas R. Savoie

[57] ABSTRACT

The present invention is directed to a process for making a soluble espresso coffee powder with improved in-cup foam comprising the steps of:

(1) foaming the coffee extract by gas injection;
(2) homogenizing the foamed extract of step(1) to reduce gas bubble size to five microns or less; and
(3) spray drying the homogenized extract of step (2) under drier outlet temperature and spray pressure conditions effective to produce a soluble espresso coffee powder wherein a majority of void space in the soluble espresso powder is comprised of gas bubbles having a size of 10 microns or less.

The resulting soluble espresso coffee powder, upon reconstitution with hot water, produces a foam which simulates the foam formed on espresso made from roasted and ground espresso coffee.

28 Claims, 13 Drawing Sheets

100 MICRONS

10 MICRONS

100 MICRONS

10 MICRONS

|————| 100 MICRONS

|————| 20 MICRONS

SOLUBLE ESPRESSO COFFEE

BACKGROUND OF THE INVENTION

1. Field of the Invention

This invention relates generally to a process of making an instant coffee, particularly a spray-dried instant coffee, which, when contacted with hot water, produces a foam which simulates the foam formed on espresso made from roasted and ground espresso coffee. More specifically, the present invention is directed to a process for making a soluble espresso coffee powder which results in an instant espresso product having significantly improved foam texture and stability compared to that produced by soluble espresso products currently available to the consumer. Dependent upon the steps used to gasify and dry the coffee extract, the resulting soluble espresso coffee powder produced by the process of the present invention has incorporated in its structure gas bubbles a majority of which are less than ten microns. The minute size of these gas bubbles is essential to the delivery of the improved in-cup foam.

2. Description of the Prior Art

The worldwide popularity and growing consumption of coffee has made it one of the leading agricultural products in international trade along with wheat, soybeans and corn. The coffee beverage itself comprises an aqueous solution of the mostly water-soluble constituents of the roasted and ground beans of the coffee plant, belonging to the family Rubiaceae. Although many species of the coffee plant exist, it is *Coffea arabica* and *Coffea robusta* which account for roughly 99% of the world production. Other species, such as *Coffea liberica*, make up the remaining 1%. Each species includes several varieties, and each variety can have different characteristic flavors dependent upon the area and conditions in which it is grown. Many times commercial roasters will blend or mix varieties to obtain a preferred flavor. Consequently, there exist many varying types of coffee.

Most generally, the coffee extract is brewed by contacting the roasted and ground coffee with boiling or near-boiling water for a predetermined brewing time. The extract, including the solutes, is then separated from the insolubles to obtain the resulting beverage which is promptly consumed. However, in this day and age where there is a significant trend towards convenience foods, the use of instant coffees is preferred by a segment of coffee consumers.

Instant coffee is basically the dried water-extract of roasted, ground coffee. The beans used to make instant coffee are blended, roasted and ground as they are in the making of regular coffee. In order to make instant coffee, the roasted, ground coffee is then charged into columns called percolators through which hot water is pumped, resulting in a concentrated coffee extract. The extract is then dried, usually by either spray drying or freeze drying, to produce the final coffee powder which is sold to the consumer. Upon the simple addition of hot water to the dried coffee powder, coffee is obtained without the need to go through the usual and more complicated brewing steps.

As is explained in Canadian Pat. No. 670,794 (to Standard Brands Incorporated), spray dried instant coffee consists of hollow spheres or aggregates thereof which form a fine and persistent foam when hot water is added to the coffee powder. This is in contrast to the coarser and more quickly subsiding foam which is formed when a hot water extract of ground roasted coffee is poured into a cup. Consequently, because typically brewed coffee does not have such a foam, the foam produced by the spray dried instant coffee is undesirable. Accordingly, many techniques have been developed to reduce, alter or eliminate the foaming characteristics of spray dried instant coffee. For example, in Canadian Pat. No. 690,794, a small amount of a monoglyceride of a higher fatty acid is incorporated in the spray dried coffee to change the appearance of the foam produced when the coffee is contacted with hot water. The new foam has the characteristics of the foam in a cup of brewed coffee rather than the more persistent fine foam normally associated with spray dried instant coffee.

On the other hand, the production of foam on coffee is not always undesirable. In particular, espresso coffee is a special coffee beverage type that is winning increased approval with the consumer. Espresso coffee typically comprises finely milled dark roasted beans which are brewed rapidly with pressurized water/steam which coincidentally results in the formation of in-cup foam. The resulting espresso beverage provides body and flavor aspects very distinct from the normal cup of coffee. Espresso is said to have a dark, rich flavor and appearance and is accompanied by a head of lighter-colored froth or foam which espresso beverage devotees consider crucial. The foam contains colloidal oil droplets and solid particles which give the espresso its characteristic texture and mouthfeel. It is to be noted that the froth or foam characteristic of espresso coffee is not at all similar to the foam formed from the spray dried instant coffee described above.

As would be expected, due to its unique flavor and other characteristics, espresso coffee is not easily made. In order to produce a consistently high-quality espresso beverage, the brewing process must be controlled very closely, i.e. a very short brewing time, specific pressures, temperatures, volumes of water delivered to the grinds, the need for precise adjustments, etc. Consequently, espresso brewing machines are relatively complicated, large and expensive and require a certain amount of skill to operate. Accordingly, it would be preferable to find an alternative method for providing an espresso beverage, one which is simpler and easier to employ.

Although the flavor of espresso coffee may be mimicked by the use of dark roast Arabicas and extraction processing conditions, the foaming characteristics of espresso are not easily replicated as the foaming of roasted and ground espresso is primarily induced by high pressure steam which is provided by the Espresso machine. The high pressure steam provides a source of sparging gas, which, with the aid of surface active species present in the coffee, form foam cells. Espresso brewing also results in the emulsification of oil into the brew and the foam. The resultant foam consists of water, gas, surface active species and oil, and has a creamy appearance and texture.

U.S. Pat. Nos. 4,830,869 and 4,903,585, both to Wimmers et al., disclose a method for making a coffee beverage having a thick layer of foamed coffee on its surface, similar in appearance to cappuccino coffee. A measured amount of spray dried instant coffee and a small amount of cold water are combined with vigorous agitation to form a foamed coffee concentrate. Then, hot water is added to make a coffee beverage.

U.S. Pat. No. 4,618,500 to Forquer discloses a method for preparing a brewed espresso-type coffee beverage which has a head of froth on the surface of the beverage. Relatively dry steam is injected into the brewed coffee beverage to produce the froth.

U.S. Pat. No. 3,749,378 to Rhodes discloses an apparatus for foaming a coffee extract. Gas is introduced into the coffee extract and the foamed coffee is then spray-dried to make a soluble coffee product having a low bulk density.

Accordingly, in response to the increasing consumer interest in premium and specialty coffees, a soluble espresso coffee would be of interest to consumers if it could deliver the distinctive espresso product attributes without the need for an Espresso machine, or the special requirements of the patents noted above, and with all the convenience and benefits of soluble coffee.

For a soluble coffee product, no chemical or mechanical method of creating foam is possible during product make-up, thus the product must be processed from a foam state prior to drying, and be capable of recovering this state when prepared for consumption.

A foamed coffee extract, if dried properly, will contain small gas bubbles in the walls of the spray dried particles. When hot water is poured on these particles, the gas bubbles will be released as the coffee dissolves, and the bubbles will float to the surface of the beverage. If sufficient surface active agents are present in the brew, the bubbles will be stabilized by the adsorption of these compounds at the gas bubble/water interface, and will be trapped as a foam layer on the surface.

Although some soluble espresso coffee powders are available in the market, they do not provide the foam characteristics desired by the true espresso connoisseur. Generally, the resulting espresso beverage lacks sufficient foam, the foam dissipates too quickly or there is a combination of both. Accordingly, a soluble espresso coffee is desirable which provides foam characteristics of a conventionally made espresso beverage.

SUMMARY OF THE INVENTION

The present invention is thus directed to enhancing the foam of instant coffee, or more precisely, to causing the foam to have the appearance and texture of the foam of brewed espresso. Specifically, the present invention is directed to a process for making a soluble espresso coffee powder comprising the steps of foaming the extract by gas injection, homogenizing the foamed extract in order to reduce gas bubble size, and spray drying the homogenized extract under sufficient drier outlet temperature and spray pressure conditions in order to obtain particles having gas bubbles incorporated therein, the majority of said gas bubbles having a size of 10 microns or less.

The present process leads to the formation of espresso products having significantly improved foam texture and stability compared to that of commercially available soluble espresso coffee beverages. This is due to the presence of a large number of gas bubbles having a size of less than 10 microns incorporated therein. The foam in the resulting espresso beverage made in accordance with the process of the present invention is formed without the use of a foaming creamer.

Although the present process is specifically directed to an espresso beverage, other soluble coffees which exhibit in-cup foam are contemplated, such as specialty coffees like Cappuccino, Greek frappe and Spanish coffees.

BRIEF DESCRIPTION OF THE DRAWINGS

FIG. 9 is a SEM micrograph of the soluble espresso powder particles made by the process of the present invention.

FIG. 10 is a SEM micrograph of a commercially available soluble espresso powder referred to as espresso powder A.

FIG. 12 is a SEM micrograph of another commercially available espresso powder referred to as espresso powder B.

DETAILED DESCRIPTION OF THE INVENTION

The present invention is directed to a process for making a soluble espresso coffee powder with improved in-cup foam comprising the steps of:

(1) foaming coffee extract by gas injection;

(2) homogenizing the foamed extract of step(1) to reduce gas bubble size to five microns or less; and (3) spray drying the homogenized extract of step (2) under drier outlet temperature and spray pressure conditions effective to produce a soluble espresso powder having gas bubbles of sizes of 10 microns or less in the resulting powder. The resulting soluble coffee powder possesses a unique structure being comprised of void space made up of relatively homogenous gas bubbles a majority of which are 10 microns or less in size.

Figure 1:
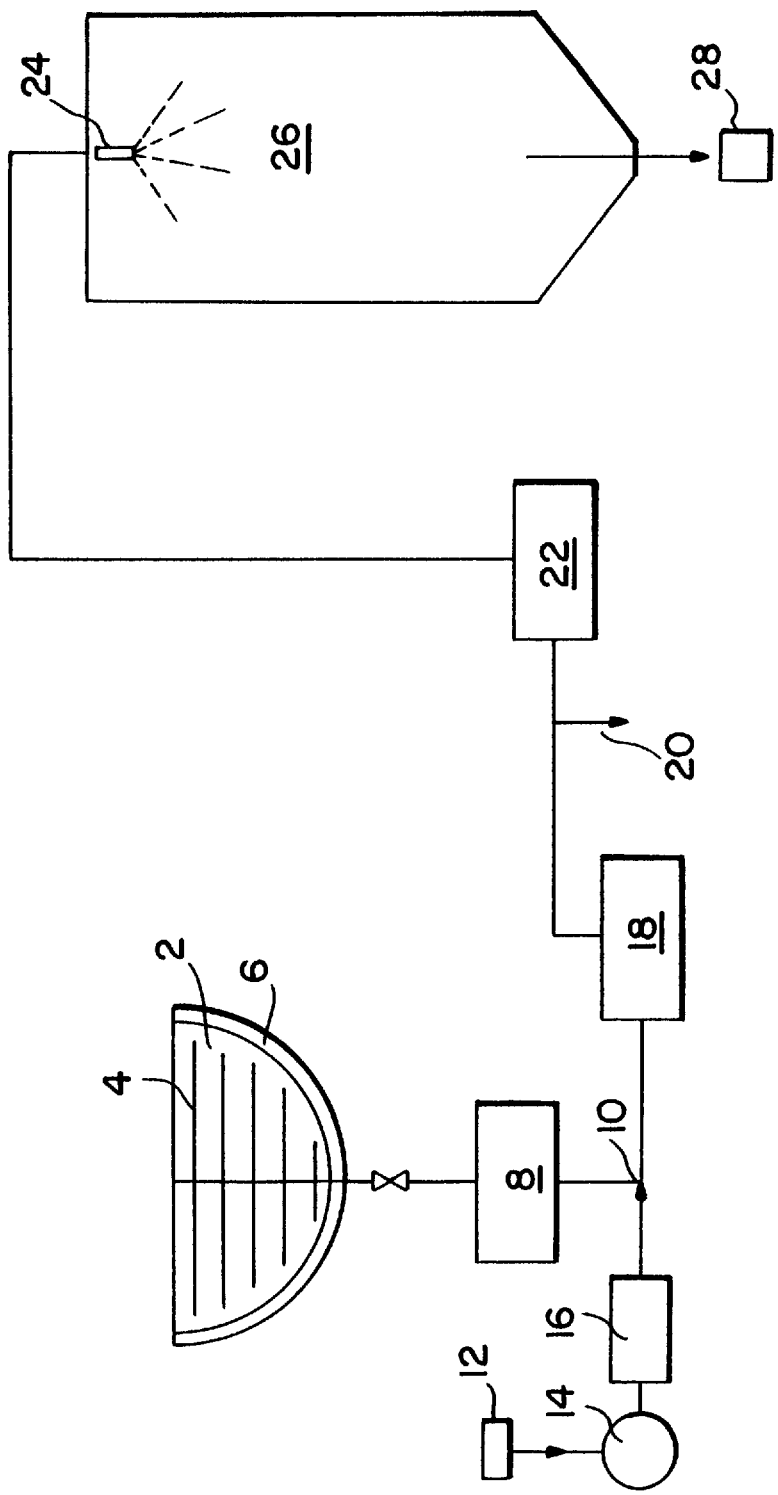
FIG. 1 is a schematic diagram of the process of the present invention.

A schematic diagram of the process of the present invention is shown in FIG. 1. The coffee extract is placed in a jacketed vessel 2 where it is stirred by a variable speed stirrer 4 in order to retain homogeneity. The jacketed vessel 2 is surrounded by a jacket 6 containing a cooling fluid so that the extract may be cooled and prepared for gas injection. The cooled extract is pumped past a gas injection point 10 via a rotary lobe pump 8 where it is continuously injected with gas via a sintered nozzle. The gas supply 12 is fed to the gas injection nozzle at a specific pressure and flow rate. The pressure is controlled by a pressure regulator 14, while a gas flowmeter 16 monitors the flow rate of the gas. The gasified extract is then pumped from the gas injection point 10 to a homogenizer 18 where it is homogenized and gas bubble sizes are reduced to a size of five microns or less. The homogenized extract, or foamed extract, is then pumped to a spraying nozzle 24 of a spray drier 26 with the use of a high pressure pump 22. Situated between the homogenizer 18 and the high pressure pump 22 is a drain valve 20 which is used to check the density of the foamed extract before it enters the spray drier 26. The foamed extract is spray dried to produce the spray dried product 28, the soluble espresso powder.

The coffee extract to be used in the process of the present invention is obtained in the conventional manner. Although any coffee extract or extract blend may be used in the present invention dependent upon the consumer's preferences, it has been found that the type of coffee used in making the extract significantly influenced foamability of the resulting soluble espresso powder. More particularly, it was determined that a coffee extract derived purely from Robusta coffee resulted in better in-cup foam characteristics than an Arabica coffee extract or an extract comprised of a blend of Robusta and Arabica coffees. The degree of roasting of the extract was found not to have any significant effect on the foam characteristics of the resulting soluble espresso powder.

The first crucial step in the process of the present invention is the foaming of the coffee extract by gas injection. In order to properly prepare the coffee extract for the gas injection, the extract is cooled to a temperature of under 27° C. An extract temperature ranging from about 10° to about 27° C. is preferred, with a temperature range of from about 10° to about 15° C. being most preferred.

Figure 2:
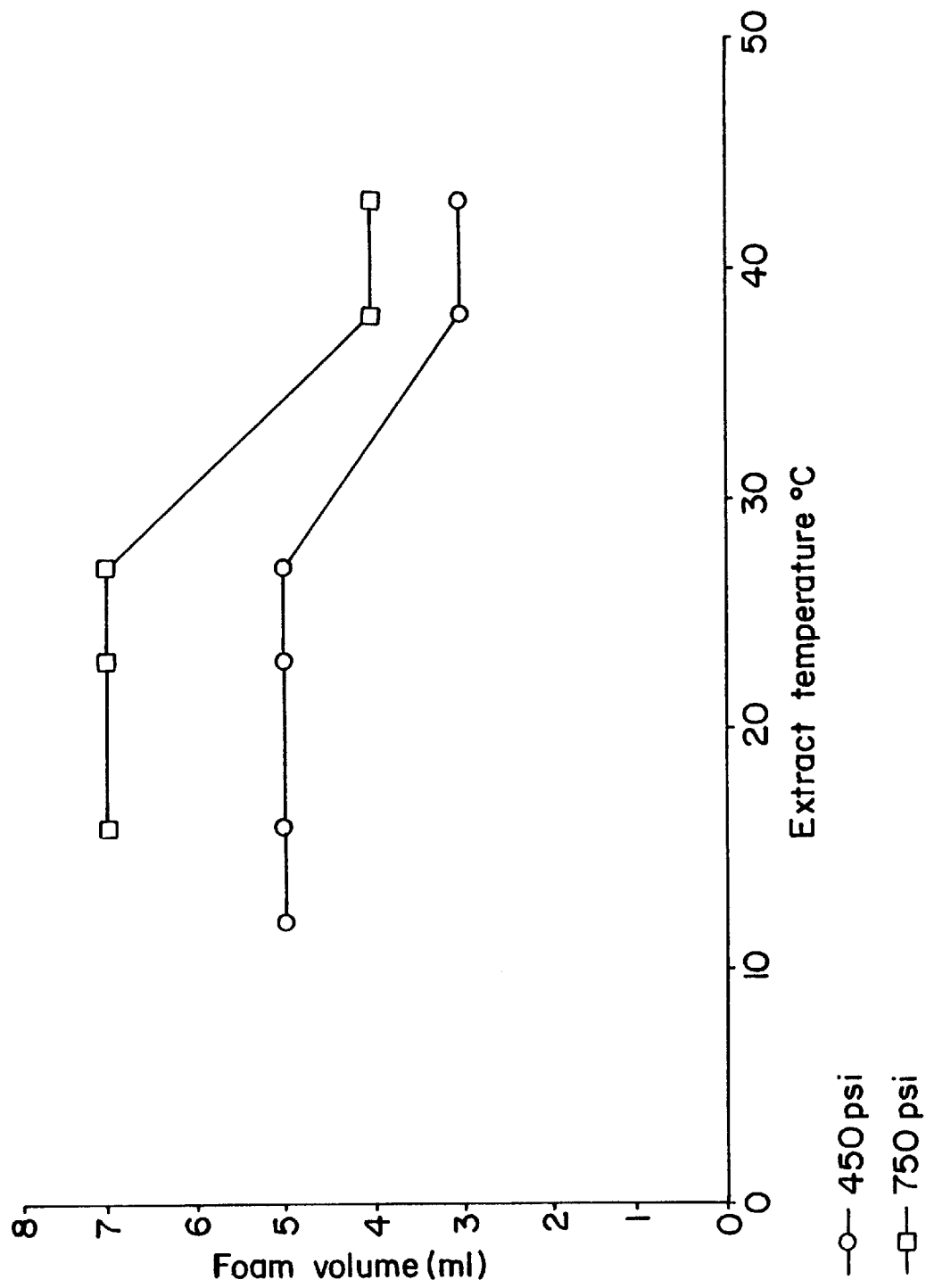
FIG. 2 is a plot which depicts the effect of the coffee extract temperature on the resulting in-cup foam produced by the soluble espresso powder made in accordance with the process of the present invention.

As is shown in FIG. 2, the in-cup foaming tendency of the resulting product remains constant for extract temperatures below about 27° C. In contrast, once the extract temperature goes above 27° C., a significant reduction in foaming tendency is seen. This can be explained by the fact that the temperature of the extract influences its viscosity which in turn influences its foam stability. For example, lower temperatures increase the viscosity of the coffee extract. An increase in viscosity aids in the retention of small gas bubbles in the foam by retarding the drainage of liquid from the foam cell walls and in turn hinders the coalescence of the foam. Thus, lower temperatures correlate to the existence of smaller size bubbles in the foam, smaller size bubbles correlate to voids present in the particles produced by the process, and the voids correlate to an increase of in-cup foam.

The fact that the temperature of the coffee extract affects the viscosity of the extract is also important in that foams of varying viscosities may show different drying characteristics due to droplet size, resulting in entrapment of voids of different sizes. As can be seen in FIG. 2, increasing the extract temperature from 27° C. to 38° C. resulted in a 40% decrease of the in-cup foam volume.

The cooling of the coffee extract can be accomplished in any conventional manner. For example, the extract can be placed in a vessel which is surrounded by a cooling jacket. The cooling jacket can be filled with any cooling liquid, examples of which include glycol, ammonia and hydrofluorocarbons. The extract should also be mixed or stirred to maintain homogeneity. Any conventional type of stirrer may be used. Speeds of about 20 to about 100 r.p.m. were found to be sufficient.

Figure 3:
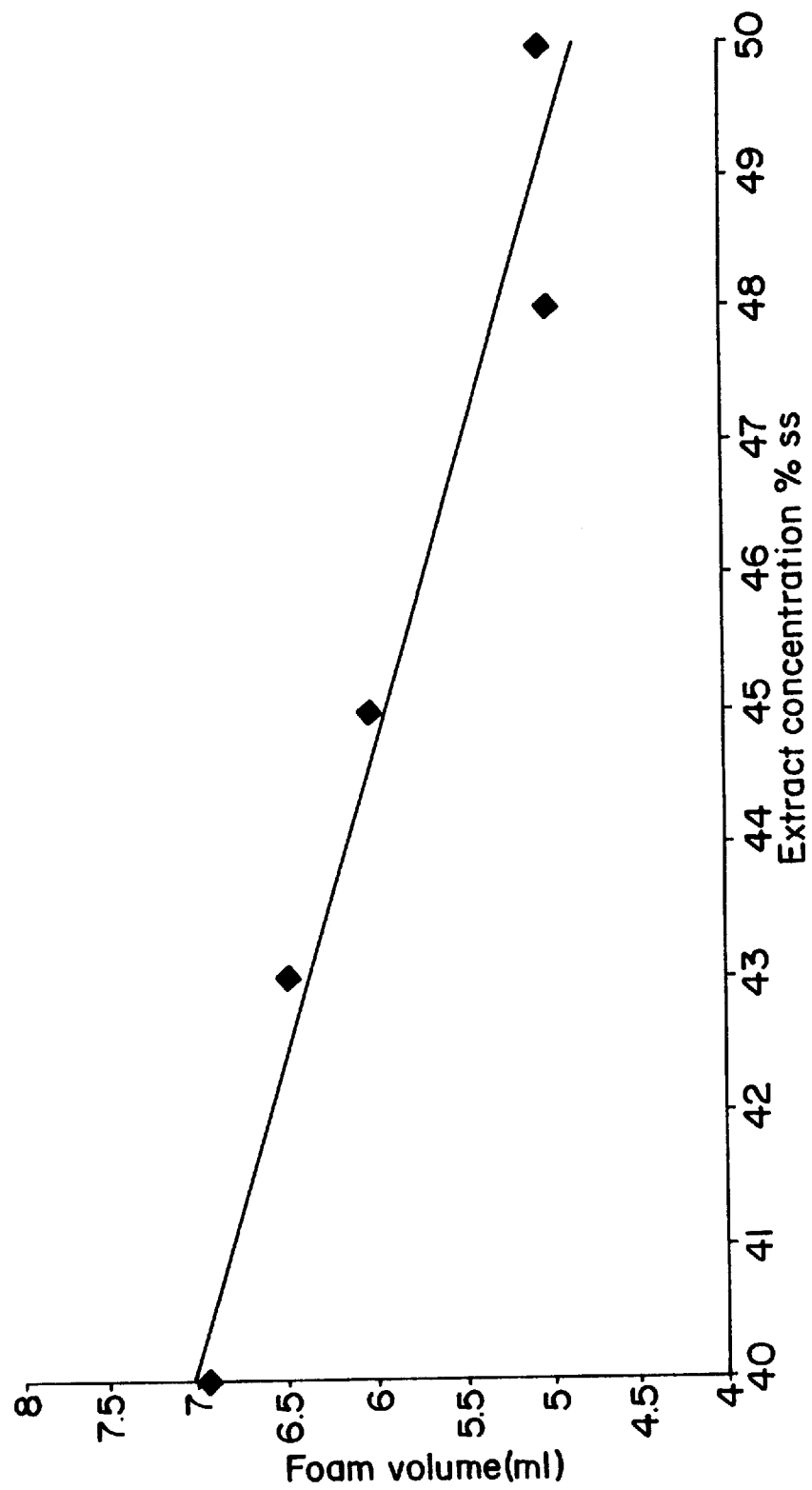
FIG. 3 is a plot which depicts the effect of the coffee extract concentration on the resulting in-cup foam produced by the soluble espresso powder made in accordance with the process of the present invention.

In addition to extract temperature, the concentration of the extract also can affect the foaming characteristics of the product. FIG. 3 illustrates the effect of extract concentration on in-cup foam volume while the spray pressure was kept constant and the drier temperature was varied to attain a 3.25% moisture level. It is clear that the in-cup foam volume decreases with increasing extract concentration. Although an increase in the extract concentration from 40 to 50% soluble solids ("ss") increases the viscosity of the foamed extract, and this usually aids in foam formation, it is believed that the decrease in water content probably had a larger adverse effect giving the results shown.

Extract concentrations ranging from about 35 to about 55% ss were found to be sufficient, with a range from about 37 to about 43% ss being preferred.

The cooled extract is then pumped to the gas injection point where it is continuously injected with gas. Although several types of gases can be employed such as nitrogen, nitrous oxide and carbon dioxide, nitrogen gas was found to give the best results.

Experiments were conducted to compare in-cup foam for espresso powders foamed with nitrogen, nitrous oxide and carbon dioxide. A simple test method was used to quantitatively measure in-cup foam (hereinafter referred to as the quantitative in-cup foam test). The method is based on using a 100 mls glass measuring cylinder of 25 mm diameter, into which 1.8 g of coffee is weighed, and then 70 mls of water at 80° C. poured onto it. The foam volumes are noted at 1 & 10 mins. time intervals. Typical results are listed in Table 1. All measurements were carried out in duplicate.

TABLE 1

Effect of gas type on in-cup foam.

| | In-cup foam volume (mls) | |
|---|---|---|
| Gas Type | 1 min | 10 min |
| $N_2$ | 7.0 | 5.5 |
| $N_2O$ | 5.0 | 1.5 |
| $CO_2$ | 1.0 | 0 |

As can be seen from the results tabulated in Table 1, the extract foamed with nitrogen gas clearly exhibited superior in-cup foam compared to extracts foamed with carbon dioxide. It is believed that due to the fact that carbon dioxide is about 55 times more soluble in water than nitrogen gas, the carbon dioxide is saturated into the extract under the foaming conditions prior to atomization, and as the droplet is formed it probably warms up and forces some of the carbon dioxide out of the solution. This carbon dioxide in turn adds to the existing gas bubbles resulting in larger gas bubbles and consequently poorer in-cup foam. Although some in-cup foam was obtained with the use of nitrous oxide, nitrogen gas was found to be the preferred gas.

In addition to the type of gas used, the quantity of gas present in the extract was also found to influence the amount of in-cup foam generated upon product reconstitution. However, the quantity of gas which can be incorporated in the extract is constrained by bulk density specifications for the finished product. That is, the foam density of the coffee extract is directly related to the amount of gas incorporated in the dried particles. Ideally, a very low foam density would be desirable, however intrinsic properties of the foamed extract combined with the processing equipment and finished product specifications impose restrictions.

For example, the viscosity of the foam increases with decreasing density. Although the relationship is initially linear, it becomes exponential at densities less than 600 g/l. This is very important in that the variation in viscosity at densities less than 600 g/l can have a serious implication on pumpability of the foamed extracts.

At the gas injection site, the cooled coffee extract is injected with a gas at a flow rate and pressure sufficient to attain the desired foam density of the foamed extract. The gas injection may be accomplished by any conventional means. It has been found that a gas injection nozzle or sintered nozzle works well. The gas is to be injected into the cooled extract continuously at a ratio from about 0.1:1 to about 2:1 gas to extract preferably from about 0.6:1 to 1.4:1.

The injection of the gas into the coffee extract is further defined in that it should be done at the above-indicated ratios at a pressure greater than the extract pressure, typically the gas pressure is 10 to 20 psi higher than the extract pressure.

Both the distribution and the size of the gas bubbles which result from the gas injection step dictate the intrinsic characteristics (e.g. viscosity) of the foam. A smaller size of gas bubble, as well as a narrow distribution of the bubbles, are desirable for the production of soluble espresso particles. That is, small and uniform gas bubbles give the greatest foam stability and creamiest texture. Large bubbles drain and break quickly, leading to a short-lived cup foam. The larger bubbles also act as nuclei upon which the smaller bubbles coalesce and which in turn shortens the foam life of these smaller bubbles.

Figure 4:
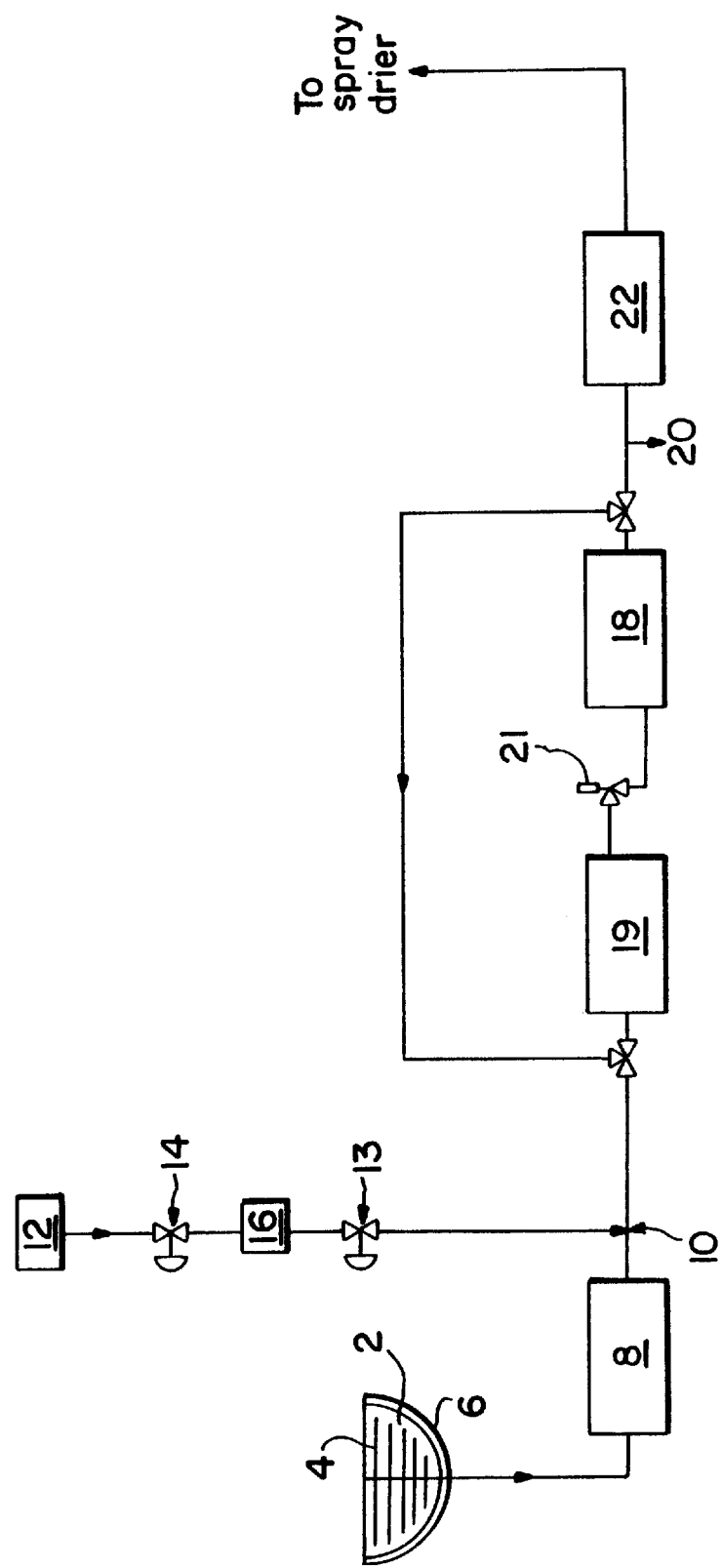
FIG. 4 is a schematic diagram of the preferred embodiment utilizing a homogenizer in conjunction with recirculation to produce gas bubbles less than five microns in size.
Figure 5:
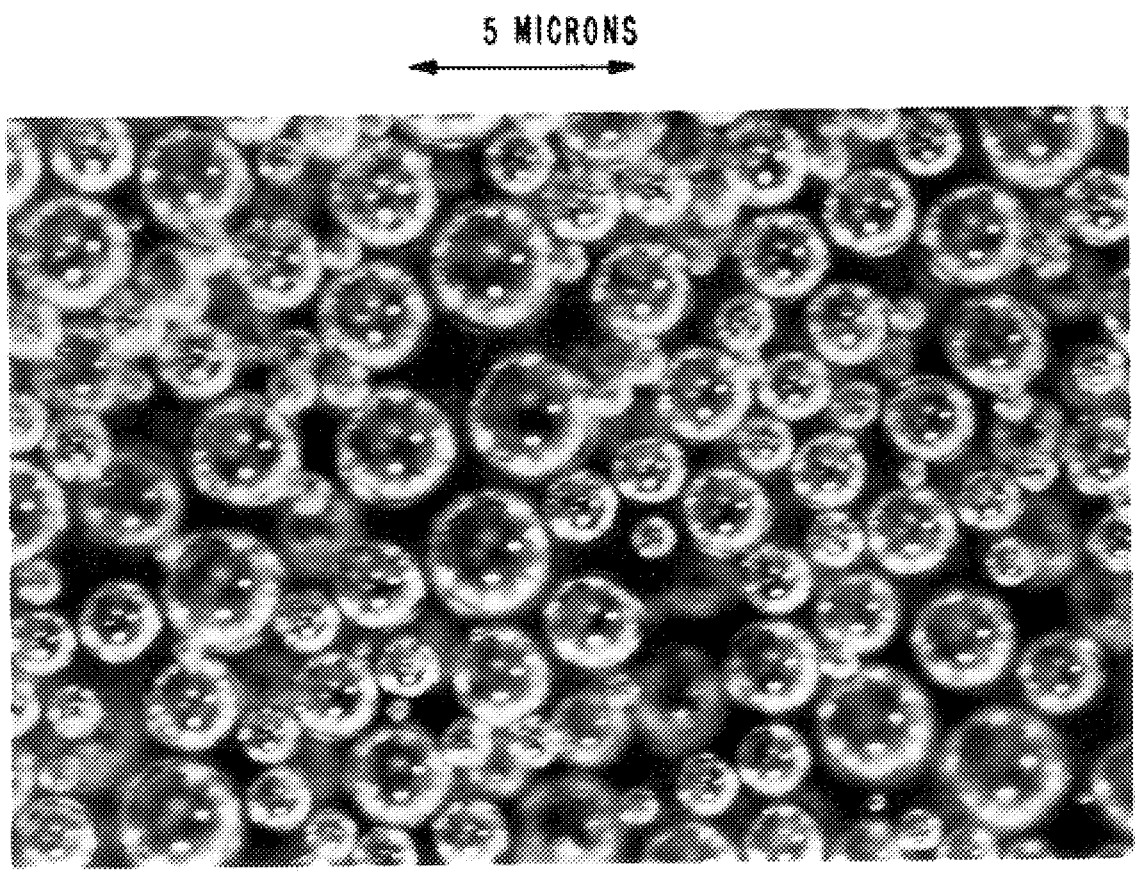
FIG. 5 is a Scanning Electron Microscope (SEM) micrograph depicting the gas bubble size in the foamed extract.

In the process of the present invention, gas bubbles having sizes of 5 microns or less are preferably produced with the use of a homogenizer in conjunction with recirculation. A preferred method is set forth in the schematic diagram as shown in FIG. 4. The figure numbers of common elements are the same as previously outlined in the discussion of FIG. 1. Extract in a jacketed vessel 2 is stirred by a variable speed stirrer 4. Glycol is utilized as a cooling fluid which is contained in jacket 6 which surrounds the vessel. The extract is cooled to reach the preferred temperature prior to gas injection. The extract is transferred from the jacketed vessel to the gas injection point 10 by a rotary lobe pump 8. Gas supply 12 provides a flow of nitrogen gas which is injected into the extract at the gas injection point via a sintered sparger. A fine needle valve 13 and a flowmeter 16 controls the amount of gas added to the extract. The pressure is controlled by pressure regulator 14. The mixture of gas and extract is passed through a homogenizer 18 containing a shear screen having a plurality of square openings in the screen of 0.4 mm×0.4 mm for thorough mixing. A high flow rate loop comprising a positive displacement pump 19 provides recirculation of the foamed extract back to the homogenizer which results in reducing gas bubbles to less than 5 microns in size. In addition, the high flow rate recirculation loop is able to maintain the pressure of the foamed extract to the high pressure (HP) spray dryer feed pump 22 above a minimum limit which prevents cavitation of the HP pump. In summary, the above processing enables the extract to be readily foamed to acceptable densities; the foam consisting of very small gas bubbles. The density of the foamed extract is varied by altering the amount of gas injected into the extract and is checked by taking samples at drain valve 20 prior to HP pump. This process results in reducing gas bubbles in the coffee extract to 5 microns or less with an average size of about 2 microns as shown in FIG. 5.

After the foamed extract exits the homogenizer, and before it is fed to the spray drier via the high pressure pump, the foamed extract is sampled at the drain valve to monitor the foam density. As noted earlier, a low foam density is desired. Specifically, a foam density ranging from about 500 to about 750 g/l is desired. More preferably, a foam density ranging from about 600 to about 650 g/l is desired with a nitrogen gas foamed extract. The preferred extract foam density can be obtained by adjusting the amount of gas injected into the coffee extract.

Equally as important as the gasification or foaming step is the atomization and drying of the homogenized extract. The atomization and drying conditions are critical to retain the incorporated gas and bubble structure in the dried product.

In the process of the present invention, the foamed extract is pumped by a high pressure pump to a spray nozzle of a spray drier for atomization. The high pressure pump used in the process of the present invention is a positive displacement piston-type pump. The pressure generated by the high pressure pump is a function of the foam density. The gas constituent of the foam is compressed by the pump pistons resulting in reduced volumetric flow at the output, consequently reducing the spray pressure. Additionally, if the pressure of the foam to the high pressure pump inlet is below a critical value of ca. 50 psi, the pump starts to cavitate. Thus sufficient pressure to the high pressure pump inlet must be maintained in order to avoid pump cavitation. In the event that very low foam densities are attained, very low pressures result leading to stoppage of the atomization process. This can be rectified by increasing the flow and pressure to the high pressure pump inlet restoring atomization until the foam density can be corrected.

The soluble coffee powder finally obtained by spray drying the foamed extract is influenced by a number of operating variables such as foam density, spray pressure, spray nozzle type and drier temperature. As noted earlier, the foam density of the extract is controlled and monitored prior to its feed into the spray drier.

Figure 6:
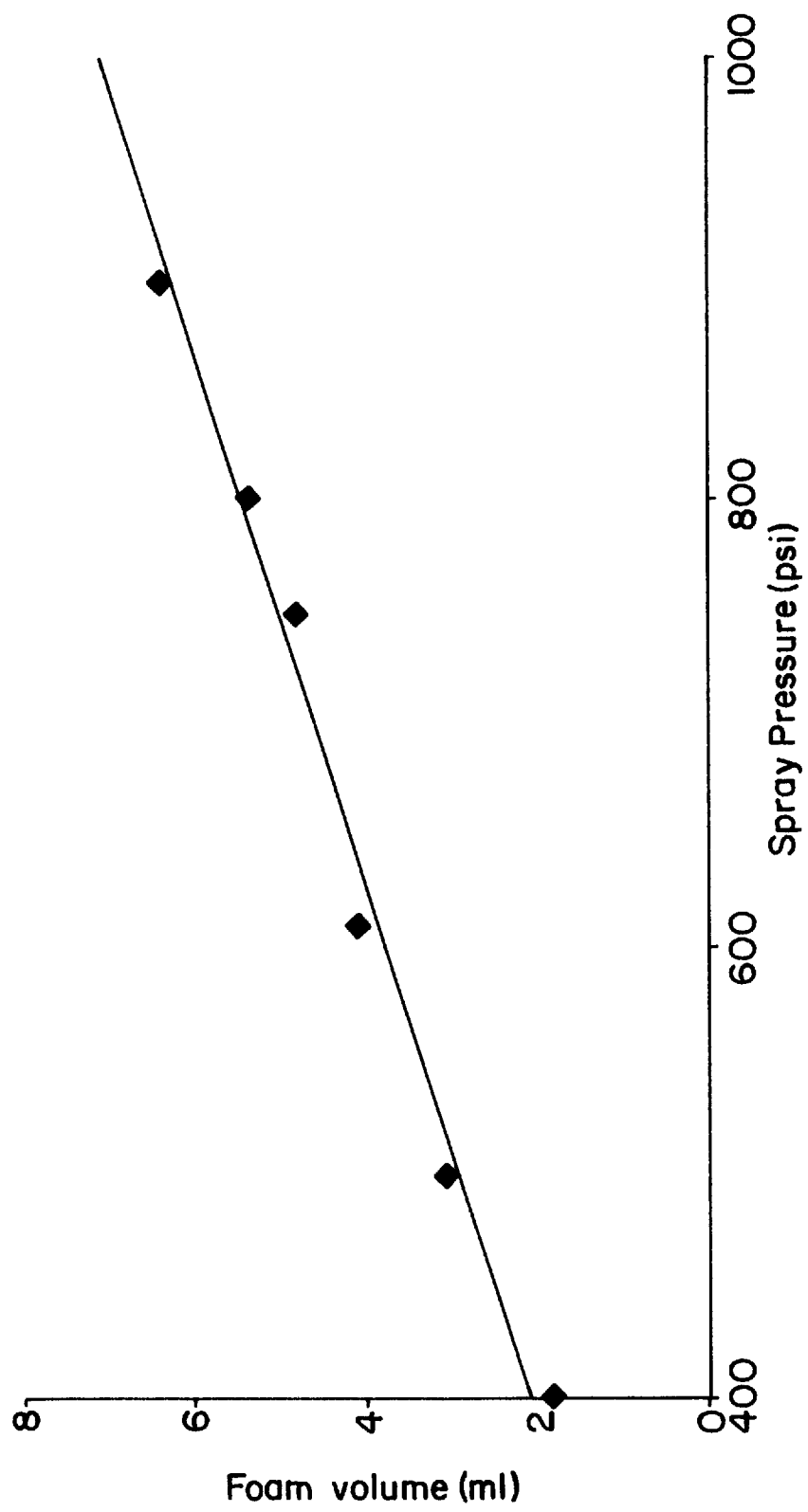
FIG. 6 is a plot depicting the effect of spray pressure used in the spray drier on the resulting in-cup foam produced by the soluble espresso powder made in accordance with the process of the present invention.
Figure 7:
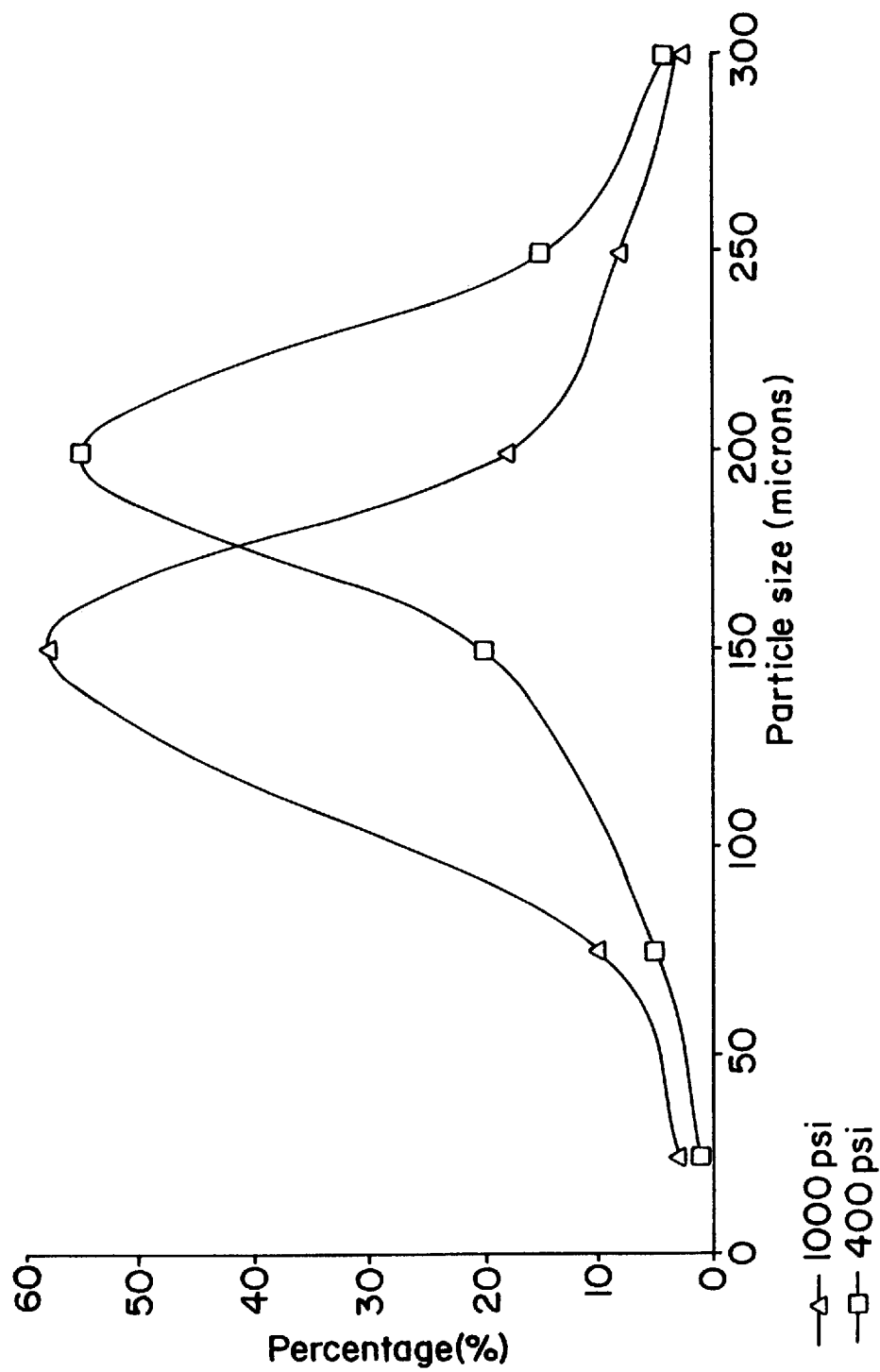
FIG. 7 is a plot of particle size distribution attained from the process of the present invention at varying spray pressures.

The spray pressures generated at atomization play an important role in determining droplet size, which on drying, it is believed, correlates to the size of the particles. Higher spray pressures tend to induce hollow cone spray patterns which generally result in smaller particles of narrow distribution. FIG. 6 depicts the effect of spray pressure on the resulting in-cup foam and clearly shows that in-cup foam volume increases with increasing spray pressure. FIG. 7 shows the effect of spray pressure on particle size distribution wherein there was a narrower distribution of particles at the higher spray pressure.

In the present process, the foamed extract is pumped to the spraying nozzle of the spray drier by the high pressure pump at a pressure of about 300 to about 2000 psi, with a range of from about 700 to about 1000 psi being more preferred. A pressure of about 1000 psi is most preferred.

As already noted, the selection of nozzle type used in the spray drier will also affect the final product. The selection of nozzle type is made in a conventional manner, that is, based on the particle size requirement, the flow rate to the nozzle and the spray pressure. A nozzle which will generate a fine hollowcone spray pattern is preferred as this type of pattern will produce small particles with narrow size distribution. It was found that increasing the nozzle core size resulted in decreasing the spray angle which consequently produced slightly larger particles which in turn translated into decreased in-cup foam. In addition, increasing the nozzle core size also resulted in reducing the pressure, which increased the moisture and eventually decreased in-cup foam as well. Spraydry & Whirljet (The Spraying Systems Co.) low capacity and high pressure (500–1500 psi) nozzles were preferably used which specifically generated a fine hollowcone spray pattern.

Figure 8:
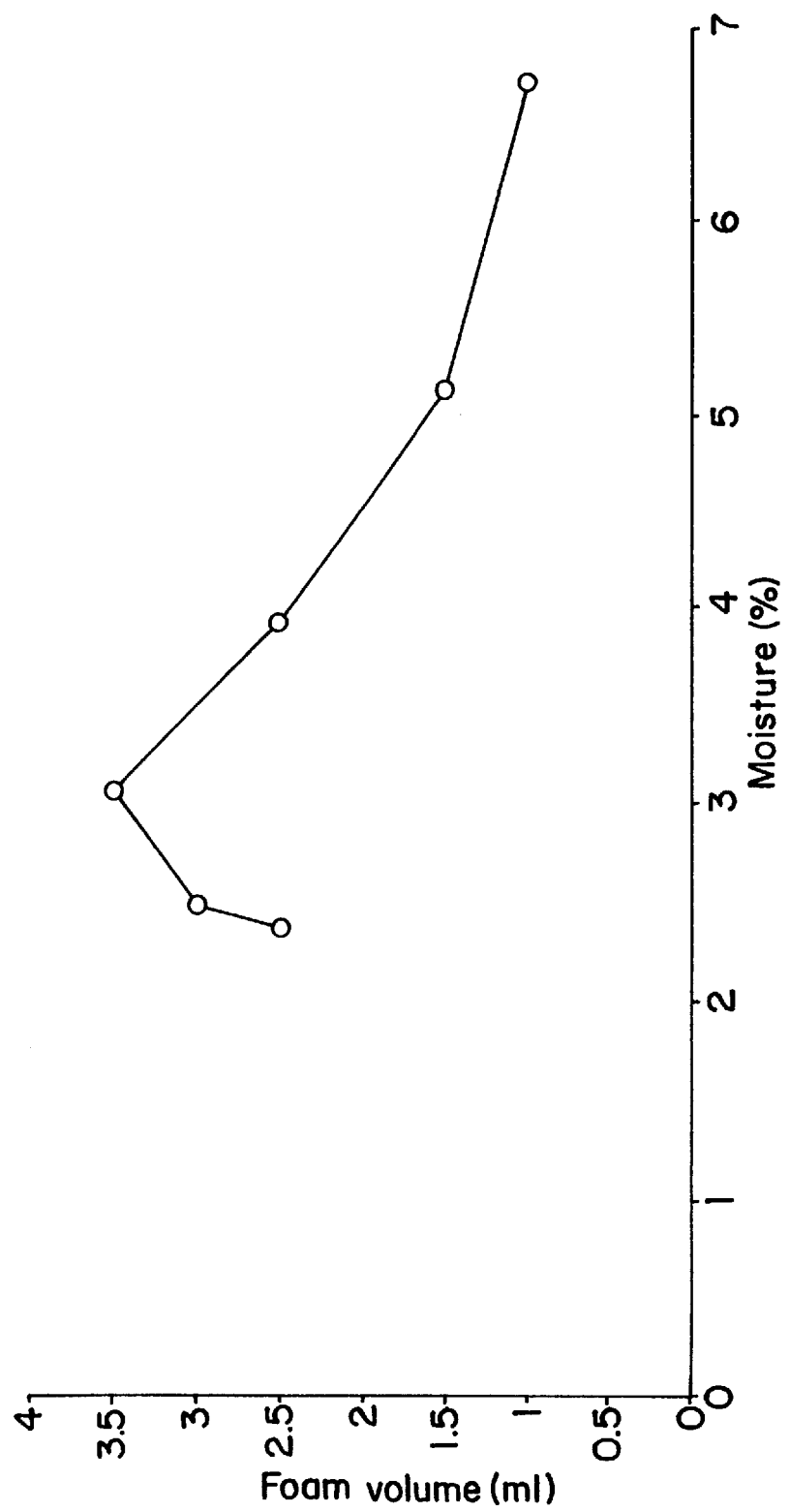
FIG. 8 is a plot depicting the effect of the per cent moisture of the soluble espresso powder made in accordance with the process of the present invention on the resulting in-cup foam.

It was also found that optimum in-cup foam volume was generated by the process of the present invention at a particle moisture of 3.25% (see FIG. 8). It should be noted that particle moisture itself is controlled by the atomization and drying conditions, i.e. air flow, temperature, etc. Moisture was found to show an inversely proportional relationship with drier temperature. Accordingly, a particle or powder moisture of from about 3 to about 3.5% is preferred.

The drier inlet temperature of the spray drier to be used in the process of the present invention should be from about 140° to about 190° C. The drier outlet temperature should range from about 85° to about 105° C., with a temperature of from about 90° to about 100° C. being preferred.

Optionally, the addition of food-grade surfactants can improve in-cup foam height and stability even further. Thus, one can increase product performance by adding from about 0.1 to about 2.0% by weight of food grade surfactants. Such food grade surfactants include Biofoam (propylene glycol alginate), Hyfoama (wheat protein), saponine (Glycoside), carboxymethylcellulose, tween (polysorbate) and gum arabic, mixtures thereof and the like.

With the addition of food grade surfactants, it has been found that product performance can be increased. Depending on the type of surfactants used, an added concentration of about 1% surfactant to the extract can result in improved in-cup foam in the range of about a 35–45% increase at the 1 minute time interval after reconstitution and about a 80–100% increase at the 10 minute time interval following reconstitution.

The soluble espresso powder produced by the process of the present invention produces, upon reconstitution, an espresso beverage with improved in-cup foam. That is, the espresso beverage prepared from the soluble espresso powder made by the present process leads to the formation of espresso products having improved foam texture and foam stability as compared to espresso beverages prepared from commercially available espresso powders. The foam characteristics attained from the soluble espresso coffee powder made by the present process closely resembles that of the traditionally made espresso coffee.

The soluble espresso coffee powder made in accordance with the present invention is comprised of particles ranging from 5 to about 400 microns in size, with an average size of about 100 to about 150 microns.

The moisture present in the particles ranges from about 2.5 to about 4%, with a moisture range of about 3 to about 3.5% being preferred.

The density of the soluble espresso coffee particles range from about 0.12 to about 0.22 g/cc, with a density of about 0.16 to about 0.19 g/cc being preferred.

The commercially available soluble espresso coffee powders show higher density (0.2 to 0.25 g/cc), lower moisture (2–2.5%) and have a broader particle size distribution (10–700 microns) as compared to the product of the present invention.

The microstructure of the soluble espresso particles, as described above, is comprised of interior void space which consists of a majority of gas bubbles of 10 microns or less in size and a minority of void space in excess of 10 microns. Preferably a majority of the gas bubbles have sizes of 5 micron or less.

Due to the unique physical parameters of the soluble espresso coffee powder produced by the process of the present invention, the reconstitution of the coffee powder produces an espresso-like beverage with excellent in-cup foam. Particularly, in an average size serving, a thick foaming layer ranging from about 5 to about 6 mm is formed on the surface of the coffee solution and is stable for a period of greater than five minutes. These foaming characteristics are superior to those attained with available soluble espresso powders.

Figure 9A:
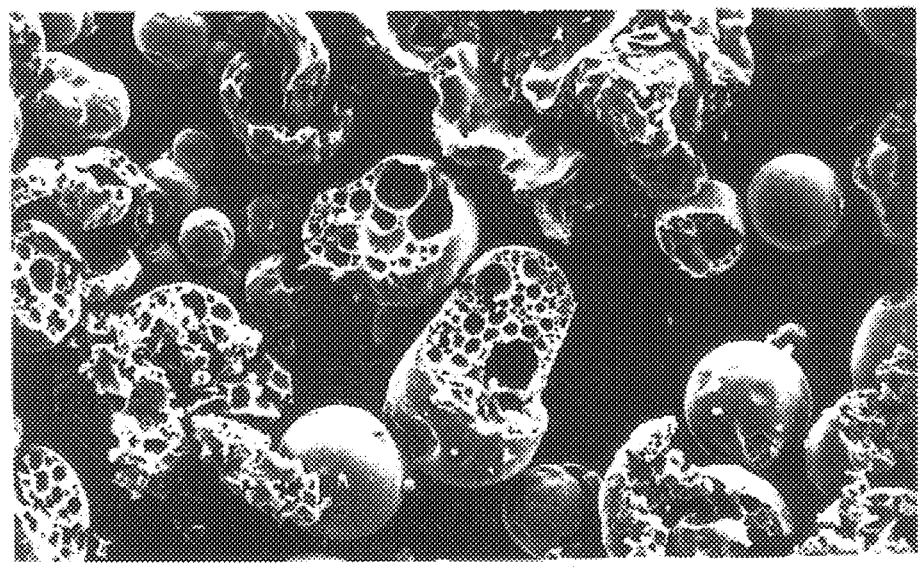
FIG. 9A is magnified 200×.
Figure 9B:
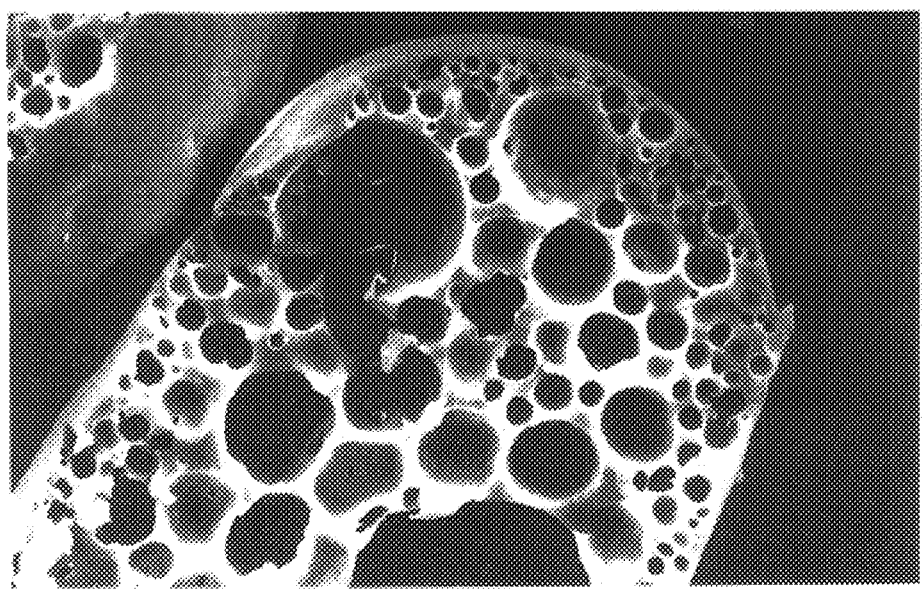
FIG. 9B is magnified 1000×.

The unique structure of the powder particles made by the process of the present invention as described above can be seen in the SEM micrograph of the particles shown in FIG. 9. From the micrograph it can easily be seen that the powder particles contain a large number of gas bubbles of small size incorporated in them. The in-cup foam is resultant of the release of these gas bubbles from the particles when hot water is poured onto them.

The microstructure of the powder particles made by the present process as shown in FIG. 9, and as described above, is more pronounced when compared to other soluble espresso powders.

One such available espresso powder, referred to as espresso powder A, produced a 3–4 mm thick foaming layer upon reconstitution which was stable for a period of under five minutes. Espresso powder A was reconstituted with hot water and tests were conducted to quantify the in-cup foam by the quantitative in-cup foam test previously discussed. The results are set forth in Table 2. The microstructure of espresso powder A can be seen in the SEM micrograph shown in FIG. 10. Although the micrograph of these particles show similar gas bubbles of a small size incorporated into the particles, the gas bubbles present in the powder particles produced by the process of the present invention (as shown in FIG. 9) are more uniformly distributed and smaller on average.

In addition, the particles of espresso powder A have fairly large voids in their centers which are detrimental to in-cup foam volume. The large voids produce large foam cells on dissolution of the particles into water. The small foam cells (formed by the small gas bubbles) coalesce on these large foam cells forming even larger foam cells. These foam cells easily and quickly burst. The result is that the powder particles produced by the present invention have improved foamability and foam stability over this commercially available product.

Figure 11:
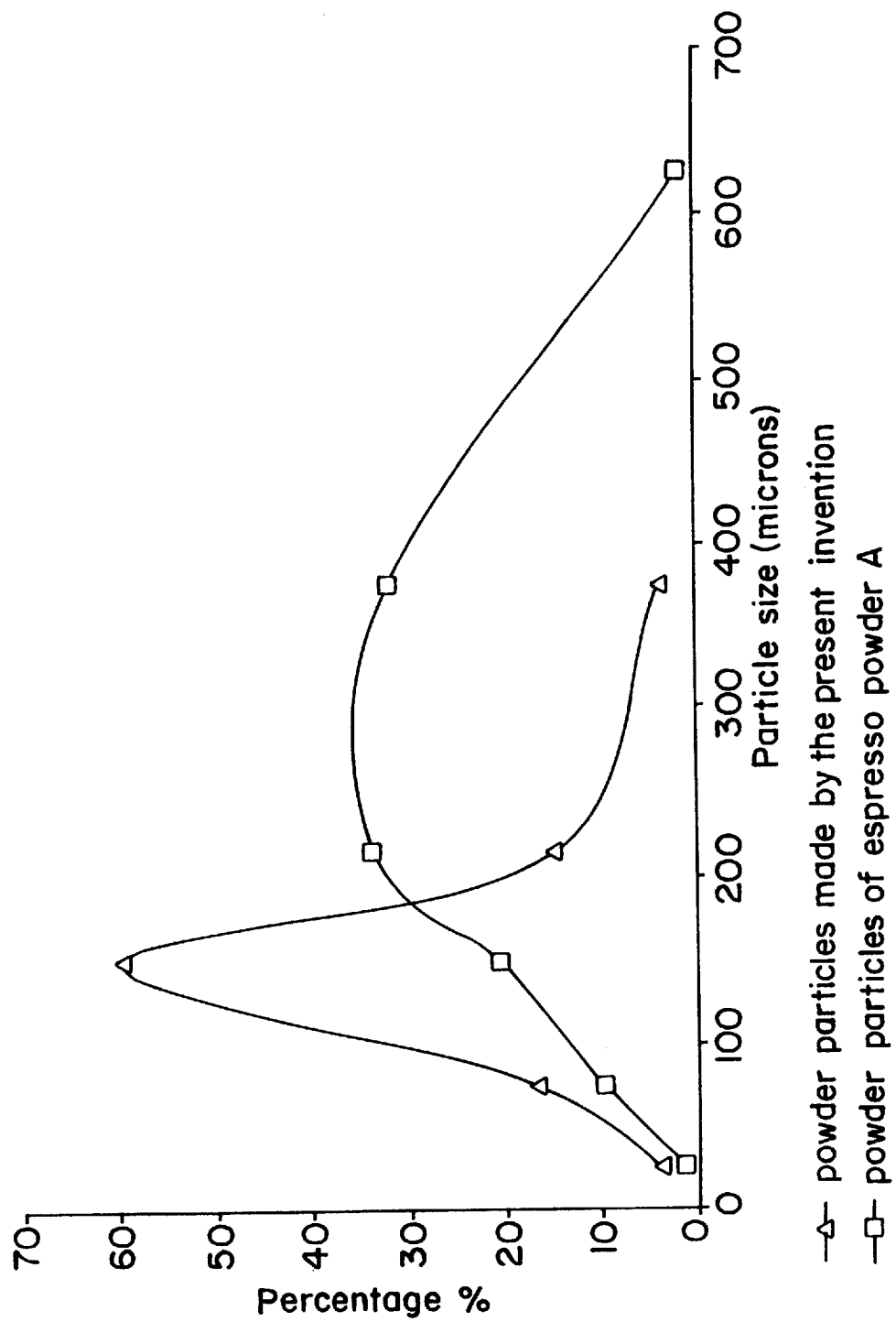
FIG. 11 is a graph depicting the particle size distribution found in the soluble espresso coffee powder made by the present invention as compared to the particle size distribution found in espresso powder A.

FIG. 11 is a graph which illustrates the difference in particle size distribution in the soluble espresso powder made by the present invention as compared to that of espresso powder A. Clearly, it is evident that the present invention product has smaller sized particles with narrower distribution compared to the commercial product. The particle size distribution for the soluble espresso powder of the present invention varied between 5 to 350 microns with 60% of population having a mean particle size of 150 micron size compared to 5 to 650 microns with 35% of population having a mean particle size of 300 microns size for espresso powder A. In addition, in espresso powder A, the gas bubbles of less than 10 microns occupied less than 20% of the gas bubble population.

Figure 10A:
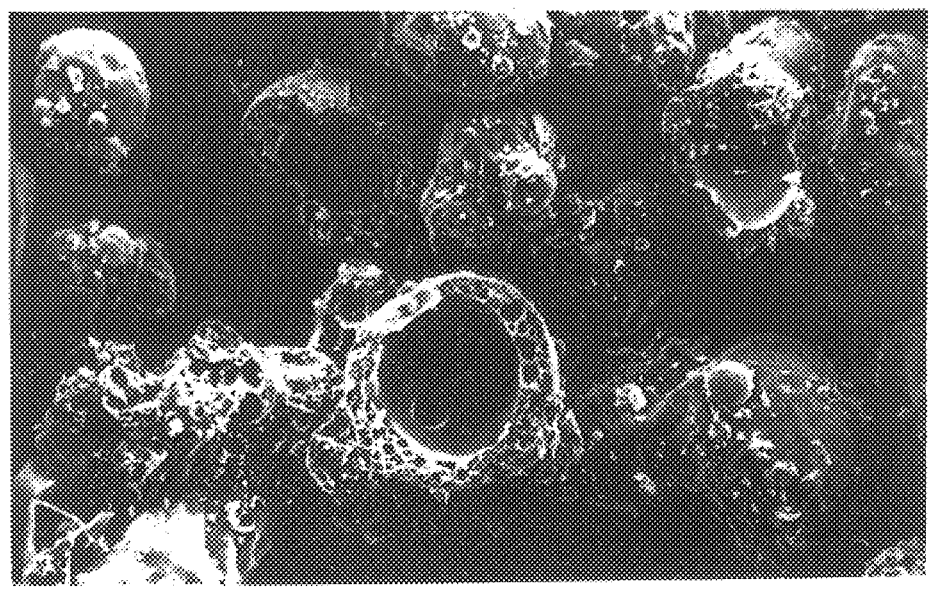
FIG. 10A is magnified 200×.
Figure 10B:
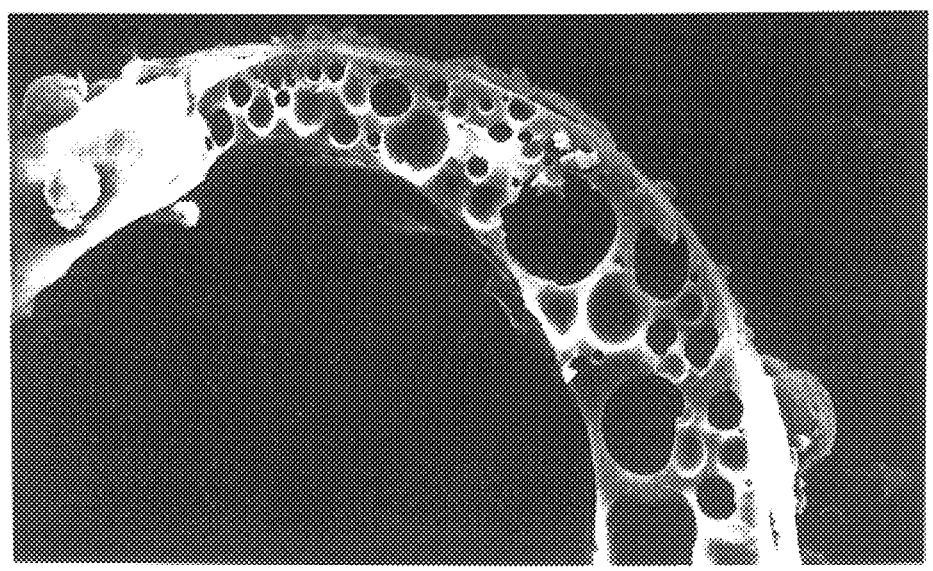
FIG. 10B is magnified 1000×.

As reported by Crosby and Weyl (E. J. Crosby and R. W. Weyl, "Foam spray drying: general principles", AIChE Sym. Series, 1992, No. 163, vol. 73, 82–94) foamed droplets develop into a sphere or spherical shell depending on drying conditions and droplet size. The formation of the sphere is beneficial as the gas bubbles of the foam are retained as gas voids in the dried particle. However, the formation of a spherical shell can result in an entrapment of large gas void/voids in the center of the particle. It seems that for small sized particles, spheres are formed (product of the present invention) compared to spherical shells for large sized particles (espresso product A) as shown in FIG. 9 & 10.

Figure 12A:
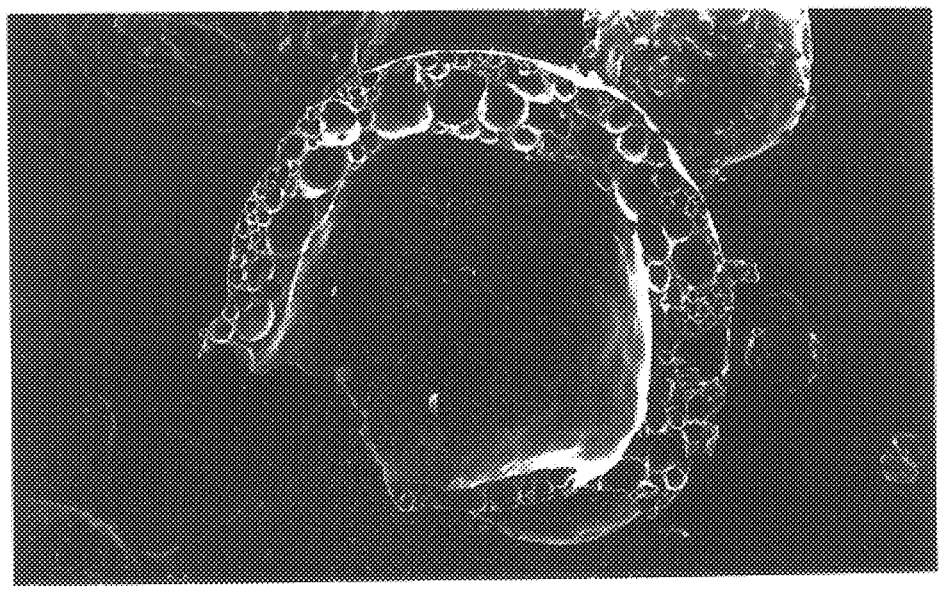
FIG. 12A is magnified 200×.
Figure 12B:
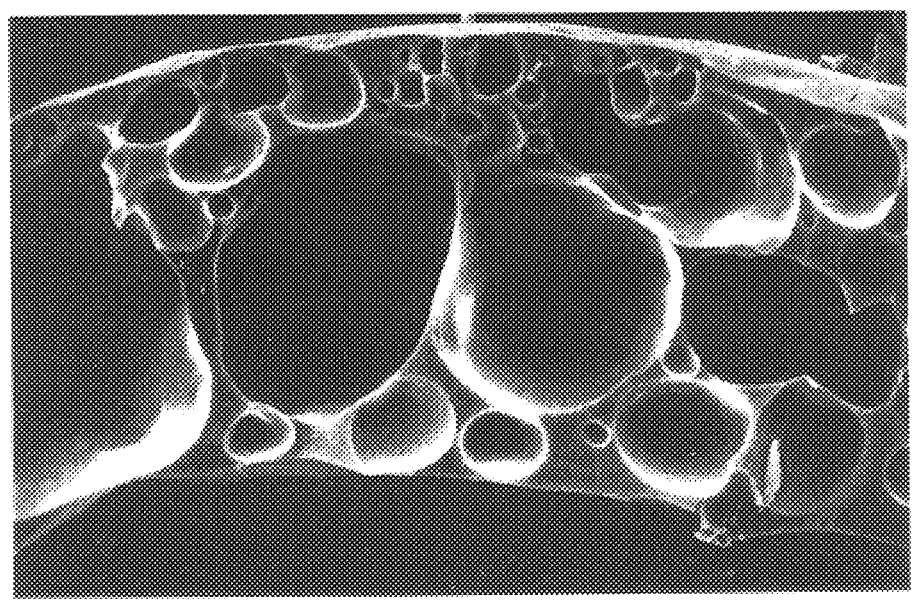
FIG. 12B is magnified 1000×.

Another commercially available espresso powder, referred to as espresso powder B, produced a 1 mm thick foaming layer which was only stable for about one minute. This product was also subjected to the quantitative in-cup foam test and the results are set forth in Table 2. This powder was also analyzed and the SEM micrograph is shown in FIG. 12. Comparing the microstructure of espresso powder B (FIG. 12) to that of the espresso powder made by the process of the present invention (FIG. 9), it can be clearly seen that espresso powder B has fewer gas bubbles of a small size incorporated into the particles. This obvious absence of small gas bubbles is reflected in the product's inferior in-cup foam and decreased stability.

Figure 13:
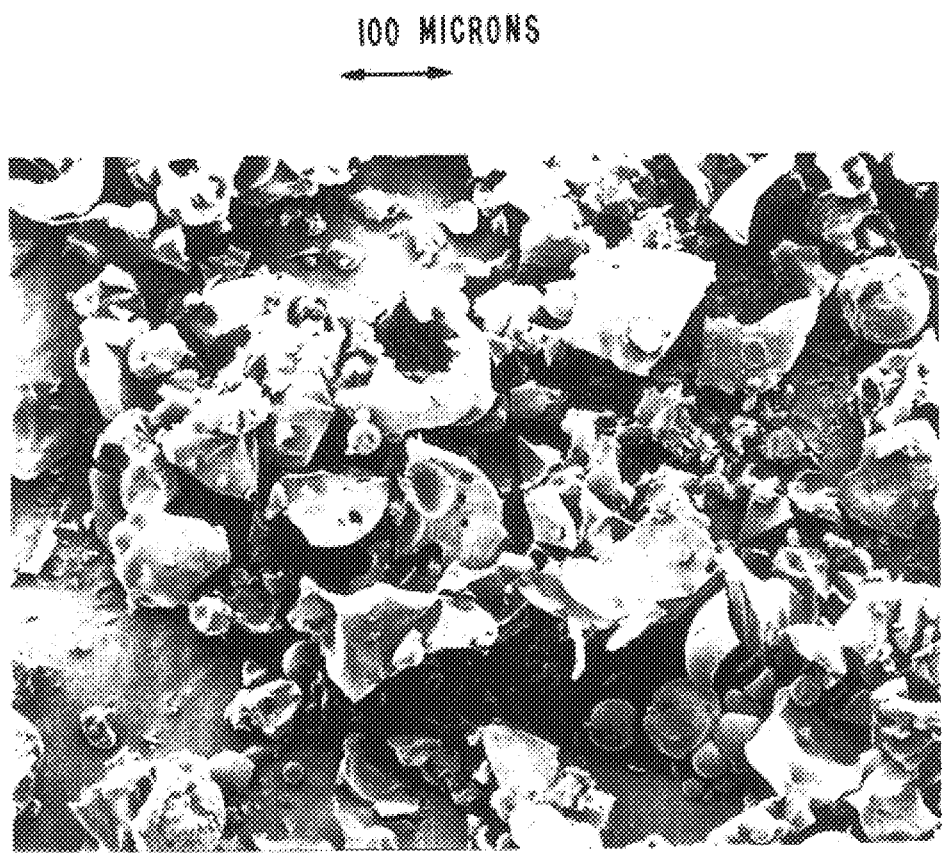
FIG. 13 is a SEM micrograph of the soluble espresso powder made by the process of the present invention with the exception that the coffee extract was not injected with any gas.

In order to illustrate the importance of the gas bubbles even more, FIG. 13 is a SEM micrograph of a soluble espresso coffee powder prepared in accordance with the present invention with the exception that the coffee extract fed to the spray drier was unfoamed extract, i.e. no gas was injected into the coffee extract. The foamability of the resulting powder particles was very poor as could be clearly predicted by looking at the SEM micrograph which shows only large gas bubbles incorporated in the center of the particles. This unfoamed powder was subjected to the quantitative in-cup foam test in the same manner as espresso powders A and B and the results are set forth in Table 2 below:

TABLE 2

In-cup foam volume for various espresso coffees

| | In-cup foam volume (mls) | | | |
|---|---|---|---|---|
| Time (mins) | Present invention powder | Espresso Powder A | Espresso Powder B | Unfoamed powder |
| 1 | 7 | 5 | 4 | 0 |
| 10 | 5 | 3 | 2 | 0 |

The following examples are provided to further illustrate the present invention.

EXAMPLE 1

A feed to drier extract of 42% ss concentration was foamed by gas injection prior to spray drying. The extract was obtained from dark roast 100% Robusta beans. The extract was first cooled to a temperature of 13° C. by placing it into a 100 liter vessel which was surrounded by a glycol cooling jacket. The extract was stirred at a speed of 60 r.p.m. to retain homogeneity.

The cooled extract was then pumped past a gas injection nozzle where it was injected continuously with nitrogen gas via a sintered nozzle at flow rates ranging from 1.0–1.2 l/min and at a pressure of from 40 to 50 psi. The extract itself exerted a pressure of 30 psi.

The gasified extract was then pumped to a Silverson in-line homogenizer (Model No. 275L, 8000 rpm and which contained a shear screen having a plurality of square openings in the screen of 0.8 mm×0.8 mm) at a flow rate of 2.5 l/min. The homogenizer was used for homogenizing and reducing the gas bubble size to less than 5 microns.

The extract density was checked via a drain valve found between the homogenizer and the spray drier high pressure pump. An extract density of 0.65 kg/l was obtained by adjusting the amount of gas injected into the extract. The foamed extract was pumped to the spraying nozzle of the spray drier (spraying Systems Co., model SX 58/21), a tall-form (tower type) chamber with a co-current air flow featuring nozzle atomization, at 500 psi pressure by the high pressure pump.

The spray drier conditions were as follows:
outlet temperature: 95° C.
inlet temperature: 160 ° C.
air flow: 1600 c.f./min The dried powder produced under the above spray drier conditions had the following physical parameters:
density: 0.16 g/cc
color: 40 Lange
size: 5–300 microns(average: 100 microns)
moisture: 2.5%

The dried powder produced excellent in-cup foam. Specifically, a 4–5 mm thick foaming layer formed on the surface of the coffee solution and was stable for a time period of greater than five minutes when 70 ml of water at 80° C. was poured onto 2.0 g of the powder in a 90 ml cup. The espresso powder was also subjected to the quantitative in-cup foam test and the results are set forth below:

| Time (mins) | In-cup foam volume (mls) |
|---|---|
| 1 | 5.5 |
| 10 | 3.5 |

The in-cup foam characteristics were creamy and tight, with the foam cells being of small size.

EXAMPLE 2

A feed to drier extract of 37% ss concentration was foamed by gas injection prior to spray drying. The extract was obtained from dark roast 100% Robusta beans. The extract was first cooled to a temperature of 10° C. by placing it into a 100 liter vessel which was surrounded by a glycol cooling jacket. The extract was stirred at a speed of 60 r.p.m. to retain homogeneity.

The cooled extract was then pumped past a gas injection nozzle where it was injected continuously with nitrogen gas via a sintered nozzle at flow rates ranging from 1 to 1.4 l/min and at a pressure of 40 psi. The extract exerted a pressure of 30 psi.

The gasified extract was then pumped to a Silverson in-line homogenizer as used in Example 1 at a flow rate of 2.5 l/min. The homogenizer contained a shear screen having a plurality of square openings in the screen of 0.4 mm×0.4 mm. As in Example 1, the homogenizer was used to homogenize and reduce the size of the nitrogen gas bubbles to less than 5 microns, with the average size being 2 microns or less.

The extract density was checked via the drain valve as in Example 1 and the amount of gas injected into the extract was adjusted to attain an extract density of 0.6 kg/l. The foamed extract was pumped to the spraying nozzle of the spray drier (same as in Example 1) at 1000 psi pressure by the high pressure pump.

The spray drier conditions were as follows:
outlet temperature: 95° C.
inlet temperature: 145° C.
air flow: 1600 c.f./min The dried powder produced under the above spray drier conditions had the following physical parameters:
density: 0.16 g/cc
color: 40 Lange
size: 5–250 microns (average:100 microns)
moisture: 3.25%

As in Example 1, the dried powder produced excellent in-cup foam upon reconstitution. Specifically, a 5–6 mm thick foaming layer formed on the surface of the coffee solution and was stable for a time period of greater than five minutes. The quantitative in-cup foam test was conducted and the results are set forth below:

| Time (mins) | In-cup foam volume (mls) |
|---|---|
| 1 | 7 |
| 10 | 5 |

The foam possessed the desirable creamy and tight characteristics similar to the foam characteristics reported in Example 1.

EXAMPLE 3

A feed to drier extract of 40% ss concentration was foamed by gas injection prior to spray drying. The extract was obtained from a 50/50 blend of Robusta/Arabica beans. The extract was cooled to 15° C. while being stirred at a speed of 50 r.p.m. The cooled extract was then injected with nitrogen gas as described in Example 1, the gas having a flow rate of 1.4 l/min at a pressure of 50 psi.

The gasified extract was then pumped to a homogenizer as described in Example 2. The flow rate was 2.5 l/min. The size of the gas bubbles were reduced to about 5 microns, with an average size of 2 microns. The amount of gas being injected was adjusted until an extract density of 0.6 kg/l was obtained. A high pressure pump pumped the foamed extract to the spray drier at a pressure of 1000 psi. The spray drier conditions were as follows:

outlet temperature: 100° C.

inlet temperature: 150° C.

air flow: 1600 c.f./min

The dried powder produced under the above-noted spray drier conditions had the following physical parameters:

density: 0.18 g/cc color: 30 Lange size: 5–300 microns (average: 150 microns)

moisture: 3.25%

The dried powder produced a good in-cup foam. Specifically, a 3–4 mm thick foaming layer formed on the surface of the coffee solution and was stable for a time period of about 5 minutes. The product was tested utilizing the previously discussed quantitative in-cup foam test, to measure the height and durability of the foam and the results are reported below:

| Time (mins) | In-cup foam volume (mls) |
|---|---|
| 1 | 5.5 |
| 10 | 3.5 |

The in-cup foam characteristics were creamy, with foam cells constituting large and small size.

EXAMPLE 4

A feed to drier extract of 40% ss concentration was foamed by gas injection prior to spray drying as described in Example 2 with the exception that the extract further contained a 1% concentration of a combination of the non-coffee surfactants Biofoam (propylene glycol alginate) and Hyfoama 66 (wheat protein). The extract was then homogenized and spray dried as described in Example 2. The resulting soluble espresso powder was compared to the soluble espresso powder formed in Example 2, i.e. made without any non-coffee surfactants, with respect to foamability. The results are shown in Table 3.

TABLE 3

In-cup foam tendency of Espresso powder with and without non-coffee surfactants.

| | In-cup foam volume (ml) | |
|---|---|---|
| Time (mins) | Powder w/surfactants | Powder w/o surfactants |
| 1 | 10 | 7 |
| 10 | 10 | 5 |

As can be seen by the results tabulated in Table 3, it is clear that the addition of non-coffee surfactants to the coffee extract significantly improved the in-cup foam volume and stability. Specifically, a 40% increase was seen at the 1 minute time interval following reconstitution, and a 100% increase was seen at the 10 minute interval following reconstitution.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A process for making a soluble espresso coffee powder comprising the steps of:
   (1) foaming coffee extract by gas injection;
   (2) homogenizing the foamed extract of step (1) to reduce gas bubble size to five microns or less; and
   (3) spray drying the homogenized extract of step (2) under drier outlet temperature and spray pressure conditions effective to incorporate and retain small gas bubbles in the resulting powder such that a majority of void space in the soluble espresso coffee powder is comprised of gas bubbles having a size of 10 microns or less.

2. The process according to claim 1 wherein said coffee extract is obtained from Robusta coffee.

3. The process according to claim 1 wherein said coffee extract is obtained from a blend of Robusta coffee and Arabica coffee.

4. The process according to claim 1 wherein prior to step (1), said coffee extract is cooled to a temperature of about 10° C. to about 27° C.

5. The process according to claim 1 wherein said coffee extract has a concentration of between about 35 to about 55% soluble solids.

6. The process according to claim 5 wherein said coffee extract has a concentration of between about 37 to about 43% soluble solids.

7. The process according to claim 1 wherein the coffee extract in step (1) is foamed by injecting nitrogen gas into said extract.

8. The process according to claim 1 wherein the coffee extract is foamed under sufficient gas flow rates and pressure conditions effective to attain a foam density of between about 500 to about 750 g/l.

9. The process according to claim 8 wherein the foam density is between about 600 to about 650 g/l.

10. The process according to claim 8 wherein said foam density is attained with a ratio of from about 0.1:1 to about 2:1 gas to extract.

11. The process according to claim 10 wherein said ratio ranges from about 0.6:1 to 1.4:1.

12. The process according to claim 1 wherein the injection of gas into the extract is accomplished by utilizing a gas pressure which is greater than the extract pressure.

13. The process of claim 12 wherein the gas pressure is 10 to 20 psi greater than the extract pressure.

14. The process according to claim 1 wherein the homogenized extract of step (3) is pumped to the spray drier at a pressure of between about 300 and about 2000 psi.

15. The process according to claim 14 wherein the homogenized extract of step (3) is pumped to the spray drier at a pressure of between about 700 and about 1000 psi.

16. The process according to claim 1 wherein said drier outlet temperature in step (3) is from about 85° to about 105° C.

17. The process according to claim 1 wherein said spray drier of step (3) has an inlet temperature of from about 140° to about 190° C.

18. The process according to claim 1 wherein the resulting powder formed in step (3) has a particle moisture of from about 2.5 to about 4.0%.

19. The process according to claim 1 wherein the coffee extract further comprises an effective amount of a food-grade surfactant sufficient to increase in-cup foam following reconstitution by at least 35% of the resulting coffee powder.

20. The process according to claim 19 wherein the food-grade surfactant is selected from the group consisting of propylene glycol alginate, wheat protein, saponine, carboxymethylcellulose, gum arabic, tweens and mixtures thereof.

21. The process according to claim 20 wherein said food-grade surfactant is added to the coffee extract in a concentration of about 0.1 to about 2%.

22. A process for making a soluble espresso coffee powder comprising the steps of:

(1) cooling a coffee extract obtained from Robusta beans having a concentration of from about 37 to about 43% ss to a temperature of between about 10° C. to about 15° C.;

(2) foaming the cooled coffee extract of step (1) by injecting nitrogen gas into the extract at a gas to extract ratio of from about 0.6:1 to 1.4:1 wherein the gas has a pressure which is 10 to 20 psi greater than the pressure of the extract;

(3) homogenizing the foamed extract of step (2) to attain a foam density of between about 500 to about 750 g/l and a gas bubble size of 5 microns or less; and (4) spray drying the homogenized extract in a spray drier at a spray pressure of about 700 to about 1000 psi, a drier inlet temperature of about 140° to about 190° C., and a drier outlet temperature of about 90° to about 100° C. for a time sufficient to attain a soluble espresso coffee powder comprising particles having a moisture of about 3 to about 3.5% wherein a majority of void space in said soluble espresso powder is comprised of gas bubbles having a size of 10 microns or less.

23. A soluble espresso coffee powder which comprises:

(1) a moisture content of from about 2.5 to about 4.0%;

(2) a density of from about 0.12 to about 0.22 g/cc; and (3) wherein said soluble espresso coffee powder which comprises an interior void space which consists of a majority of gas bubbles of 10 microns or less and minority void space in excess of 10 microns such that upon reconstitution with hot water a coffee product with a layer of espresso-type foam is produced.

24. The product of claim 23 wherein the majority of the gas bubbles are five microns or less.

25. The product of claim 23 wherein the moisture content is from about 3.0 to about 3.5%.

26. The product of claim 23 wherein the density is from about 0.16 to 0.19 g/cc.

27. The product of claim 23 wherein the soluble espresso coffee powder has a particle size ranging from about 5 to about 400 microns.

28. The product of claim 27 wherein the soluble espresso coffee powder has an average particle size of from about 100 to about 150 microns.

* * * * *